(12) United States Patent
Wang et al.

(10) Patent No.: US 8,893,292 B2
(45) Date of Patent: Nov. 18, 2014

(54) PRIVACY PRESERVING STATISTICAL ANALYSIS FOR DISTRIBUTED DATABASES

(71) Applicant: Mitsubishi Electric Research Laboratories, Inc., Cambridge, MA (US)

(72) Inventors: Ye Wang, Andover, MA (US); Bing-Rong Lin, State College, PA (US); Shantanu Rane, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/676,528

(22) Filed: Nov. 14, 2012

(65) Prior Publication Data

US 2014/0137260 A1    May 15, 2014

(51) Int. Cl.
   *G06F 21/00*   (2013.01)
   *G06F 21/60*   (2013.01)
   *G06F 21/62*   (2013.01)

(52) U.S. Cl.
   CPC ............ *G06F 21/60* (2013.01); *G06F 21/6245* (2013.01); *G06F 21/6254* (2013.01)
   USPC ............................................. 726/26; 726/27

(58) Field of Classification Search
   CPC ................ H04W 12/02–12/12; H04L 9/0858; H04L 9/0866; G06F 21/60; G06F 21/6245; G06F 21/6254
   USPC ............ 726/5, 6, 14, 18, 35, 26–30; 713/152, 713/153, 156, 171, 187, 193, 189, 161; 380/24, 25, 46, 49, 50, 28, 173, 278; 708/5, 8, 255, 270, 422, 441, 671, 200
   See application file for complete search history.

(56) References Cited

U.S. PATENT DOCUMENTS

| | | | | |
|---|---|---|---|---|
| 4,997,288 | A | * | 3/1991 | Rosenow ........................... 380/2 |
| 5,699,431 | A | * | 12/1997 | Van Oorschot et al. ......... 380/30 |
| 6,014,445 | A | * | 1/2000 | Kohda et al. ..................... 380/28 |
| 6,463,538 | B1 | * | 10/2002 | Elteto ............................ 713/190 |
| 7,526,084 | B2 | * | 4/2009 | Smaragdis et al. .............. 380/28 |
| 7,725,730 | B2 | * | 5/2010 | Juels et al. ..................... 713/183 |

(Continued)

OTHER PUBLICATIONS

Ardo van den Hout et al, "Randomized Respoonse, Statistical Disclousre Control and Misclassification:a Review". International Statistical Review (2002), 70,2, p. 269-288.*

(Continued)

*Primary Examiner* — Hadi Armouche
*Assistant Examiner* — Sher Khan
(74) *Attorney, Agent, or Firm* — Dirk Brinkman; Gene Vinokur

(57) ABSTRACT

Aggregate statistics are determined by first randomizing independently data X and Y to obtain randomized data $\hat{X}$ and $\hat{Y}$. The first randomizing preserves the privacy of the data X and Y. Then, the randomized data $\hat{X}$ and $\hat{Y}$ is randomized secondly to obtain randomized data $\tilde{X}$ and $\tilde{Y}$ for a server, and helper information $T_{\tilde{X}|\hat{X}}$ and $T_{\tilde{Y}|\hat{Y}}$ for a client, wherein T represents an empirical distribution, and wherein the randomizing secondly preserves the privacy of the aggregate statistics of the data X and Y. The server then determines $T_{\tilde{X},\tilde{Y}}$. Last, the client applies the side information $T_{\tilde{X}|\hat{X}}$ and $T_{\tilde{Y}|\hat{Y}}$ to $T_{\tilde{X},\tilde{Y}}$ to obtain an estimated $\hat{T}_{X,Y}$, where "|" and "," between X and Y represent a conditional and joint distribution, respectively.

7 Claims, 4 Drawing Sheets

(56) References Cited

U.S. PATENT DOCUMENTS

| | | | |
|---|---|---|---|
| 8,204,994 | B1 | 6/2012 | Amir et al. |
| 8,329,661 | B2 | 12/2012 | Christa |
| 2006/0056695 | A1* | 3/2006 | Wu et al. .................. 382/173 |
| 2008/0137868 | A1* | 6/2008 | Sanders et al. ............ 380/278 |
| 2009/0292818 | A1* | 11/2009 | Blount et al. ............. 709/231 |
| 2011/0040820 | A1* | 2/2011 | Rane et al. ................ 708/441 |
| 2011/0119204 | A1* | 5/2011 | De Prisco et al. ......... 705/36 R |
| 2012/0222134 | A1* | 8/2012 | Orsini et al. .............. 726/28 |

OTHER PUBLICATIONS

Zhengli et al., "Deriving Private Information Randomized Data, SIGMOD", Jun. 14-16, 2005, pp. 37-48.*

Stelvio Cimato et al.,, "Privacy Preserving Risk Assesment of Credit Securities", 2009 Fifth International Conference on Signal Image Technology and Internet Based Systems, IEEE, Nov. 2009, pp. 506-513.*

Warner, Stanley L. "The linear randomized response model." Journal of American Statistical Association, vol. 66, No. 336, pp. 884-888, Dec. 1971.

X. Xiao, Y. Tao, and M. Chen, "Optimal random perturbation at multiple privacy levels," in Proc. VLDB Endow., vol. 2, No. 1. VLDB Endowment, Aug. 2009, pp. 814-825.

S. Agrawal and J. R. Haritsa, "A framework for high-accuracy privacy preserving mining," in Proceedings of the 21st International Conference on Data Engineering, ser. ICDE '05. Washington, DC, USA: IEEE Computer Society, 2005, pp. 193-204.

A. van den Hout and P. G. M. van der Heijden, "Randomized response, statistical disclosure control and misclassification: a review," International Statistical Review, vol. 70, pp. 269-288, Aug. 2002.

* cited by examiner

PRIVACY PRESERVING STATISTICAL ANALYSIS FOR DISTRIBUTED DATABASES

FIELD OF THE INVENTION

This invention relates generally to secure computing by third parties, and more particularly to performing secure statistical analysis on a private distributed database.

BACKGROUND OF THE INVENTION

Big Data

It is estimated that 2.5 quintillion ($10^{18}$) bytes of data are created each day. This means that 90% of all the data in the world today has been created in the last two years. This "big" data come from everywhere, social media, pictures and videos, financial transactions, telephones, governments, medical, academic, and financial institutions, and private companies. Needless to say the data are highly distributed in what has become known as the "cloud."

There is a need to statistically analyze this data. For many applications, the data are private and require the analysis to be secure. As used herein, secure means that privacy of the data is preserved, such as the identity of the sources for the data, and the detailed content of the raw data. Randomized response is one prior art way to do this. Random response does not unambiguously reveal the response of a particular respondent, but aggregate statistical measures, such as the mean or variance, can still be determined.

Differential privacy (DP) is another way to preserve privacy by using a randomizing function, such as Laplacian noise. Informally, differential privacy means that the result of a function determined on a database of respondents is almost insensitive to the presence or absence of a particular respondent. Formally, if the function is evaluated on adjacent databases differing in only one respondent, then the probability of outputting the same result is almost unchanged.

Conventional mechanisms for privacy, such as k-anonymization are not differentially private, because an adversary can link an arbitrary amount of helper (side) information to the anonymized data to defeat the anonymization.

Other mechanisms used to provide differential privacy typically involve output perturbation, e.g., noise is added to a function of the data. Nevertheless, it can be shown that the randomized response mechanism, where noise is added to the data itself, provides DP.

Unfortunately, while DP provides a rigorous and worst-case characterization for the privacy of the respondents, it is not enough to formulate privacy of an empirical probability distribution or "type" of the data. In particular, if an adversary has accessed anonymized adjacent databases, then the DP mechanism ensures that the adversary cannot de-anonymize any respondent. However, by construction, possessing an anonymized database reveals the distribution of the data.

Therefore, there is a need to preserve privacy of the respondents, while also protecting an empirical probability distribution from adversaries.

In U.S. application Ser. No. 13/032,521, Applicants disclose a method for processing data by an untrusted third party server. The server can determine aggregate statistics on the data, and a client: can retrieve the outsourced data exactly. In the process, individual entries in the database are not revealed to the server because the data are encoded. The method uses a combination of error correcting codes, and a randomization response, which enables responses to be sensitive while maintaining confidentiality of the responses.

In U.S. application Ser. No. 13/032,552. Applicants disclose a method for processing data securely by an untrusted third party. The method uses a cryptographically secure pseudorandom number generator that enables client data to be outsourced to an untrusted server to produce results. The results can include exact aggregate statistics on the data, and an audit report on the data. In both cases, the server processes modified data to produce exact results, while the underlying data and results are not revealed to the server.

SUMMARY OF THE INVENTION

The embodiments of the invention provide a method for statistically analyzing data while preserving privacy of the data.

For example, Alice and Bob are mutually untrusting sources of separate databases containing information related to respondents. It is desired to sanitize and publish the data to enable accurate statistical analysis of the data by an authorized entity, while retaining the privacy of the respondents in the databases. Furthermore, an adversary must not be able to analyze the data.

The embodiments provide a theoretical formulation of privacy and utility for problems of this type. Privacy of the individual respondents is formulated using $\epsilon$-differential privacy. Privacy of the statistics on the distributed databases is formulated using $\delta$-distributional and $\epsilon$ differential privacy.

Specifically, aggregate statistics are determined by first randomizing independently data X and Y to obtain randomized data $\hat{X}$ and $\hat{Y}$. The first randomizing preserves a privacy of the data X and Y.

Then, the randomized data $\hat{X}$ and $\hat{Y}$ is randomized secondsly to obtain randomized data $\tilde{X}$ and $\tilde{Y}$ for a server, and helper information on $T_{\hat{X}|\tilde{X}}$ and $T_{\hat{Y}|\tilde{Y}}$ for a client, wherein T represents an empirical distribution, and wherein the randomizing secondly preserves the privacy of the aggregate statistics of the data X and Y.

The server then determines $T_{\tilde{X},\tilde{Y}}$. Last, the client applies the side information $T_{\hat{X}|\tilde{X}}$ and $T_{\hat{Y}|\tilde{Y}}$ to $T_{\tilde{X},\tilde{Y}}$ obtain an estimated $\hat{T}_{X,Y}$, wherein "|" and "," between X and Y represent a conditional and joint distribution, respectively.

DETAILED DESCRIPTION OF THE PREFERRED EMBODIMENTS

Method Overview

Figure 1:
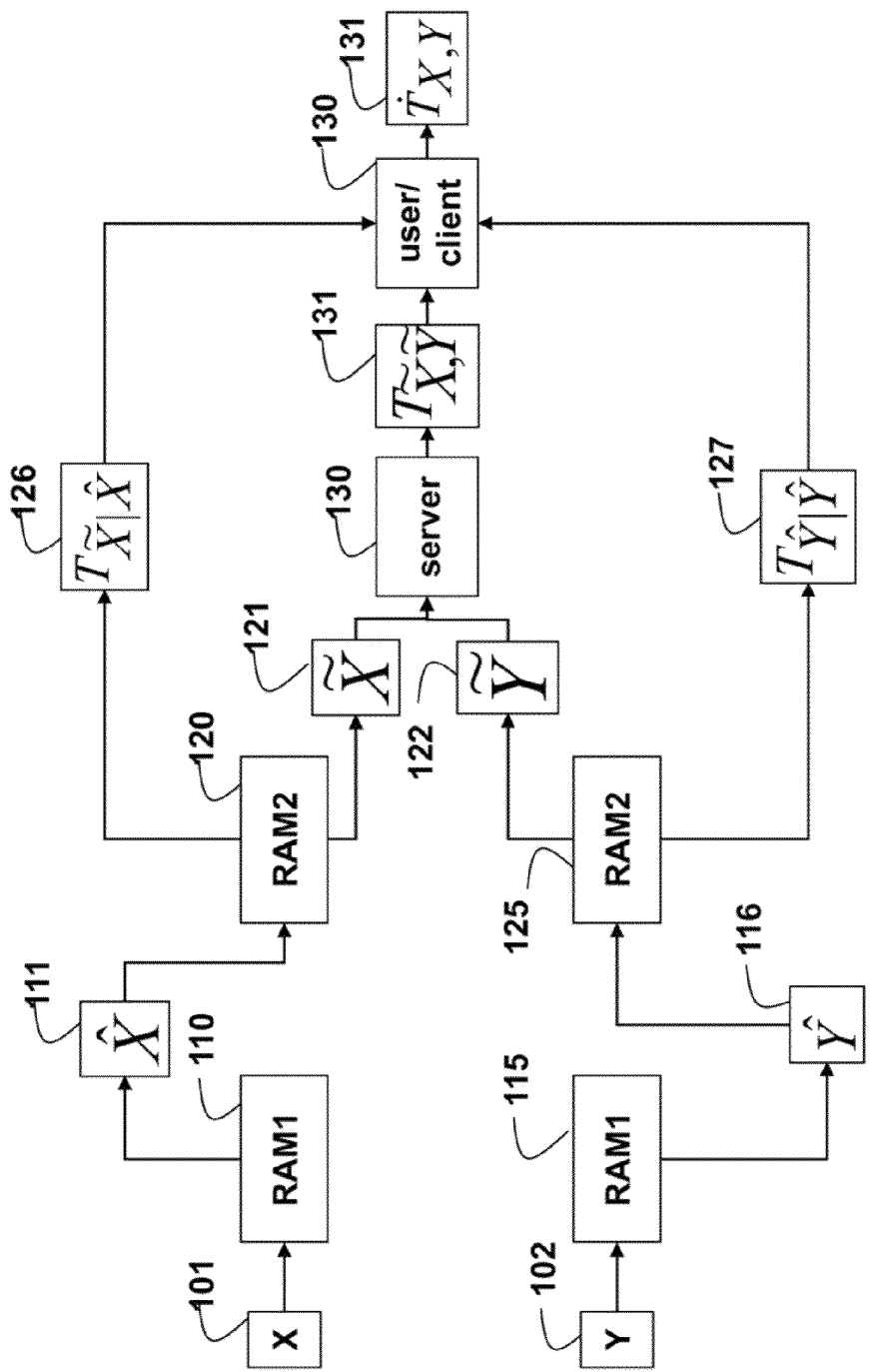
FIG. 1 is a flow diagram of a method for securely determining statistics on private data according to embodiments of the invention.

As shown in FIG. 1, the embodiments of our invention provide a method for securely performing statistical analysis on private data. This means the actual raw data is not revealed to anyone, other than sources of the data.

In security, privacy and randomization applications "weak" and strong" are terms of art that are well understood and documented. Weak means that underlying data (e.g., password, user identification, etc.) is could be recovered with know "cracking" methods. Strong means that the data is very difficult to recover in given a reasonable amount of time and reasonable computing resources.

In addition, the randomization means randomizing the data according to a particular distribution. The term encompasses the following concept. First, the data are anonymized to protect privacy. Second, data are sanitized to reinforce the notion that the operation serves the purpose of making the data safe for release.

Data X 101 and Y 102 are first randomized (RAM1) independently to obtain randomized data $\hat{X}$ and $\hat{Y}$, respectively. The randomizations 110 and 115 can be the same or different. In the preferred embodiment, we use a Post RAndomisation Method (PRAM). The security provided by 110 and 115 is relatively "weak." This means that the identities of data sources are hidden and individual data privacy is preserved, but aggregate statistics on the data could perhaps be determined with some effort.

The randomized data $\hat{X}$ and $\hat{Y}$ data are again (second) randomized (RAM2) to obtain randomized data $\tilde{X}$ and $\tilde{Y}$ for a server, and helper information $T_{\tilde{X}|\hat{X}}$ and $T_{\tilde{Y}|\hat{Y}}$ for a client, respectively. The second randomizations can be the same or different than the first randomizations. In the helper information, T represents a true empirical distribution.

In statistics, an empirical distribution is the normalized histogram of the data. Each of n data points contributes by 1/n to the empirical distribution. The empirical distribution is representative of the underlying data. The emperical distribution is sufficient to determine a large number of different types of statistics, including mean, median, mode, skewedness, quantiles, and the like.

The security provided by 120 and 125 is relatively "strong." That is, the privacy of aggregate statistics on the data X and Y is preserved.

The server 130 determines $T_{\tilde{X},\tilde{Y}}$ after $\tilde{X}$ and $\tilde{Y}$ are combined.

The client can now apply the side information $T_{\tilde{X}|\hat{X}}$ and $T_{\tilde{Y}|\hat{Y}}$ to $T_{\tilde{X},\tilde{Y}}$ to "undo" the second randomization, and obtain an estimated $\hat{T}_{X,Y}$. The estimated, indicated by above, distribution of the data X and Y is sufficient to obtain first, second, etc. order statistics. Although the client can determine statistics, the client cannot recover the exact data X and Y because of the weak security.

Method Details

Figure 2:
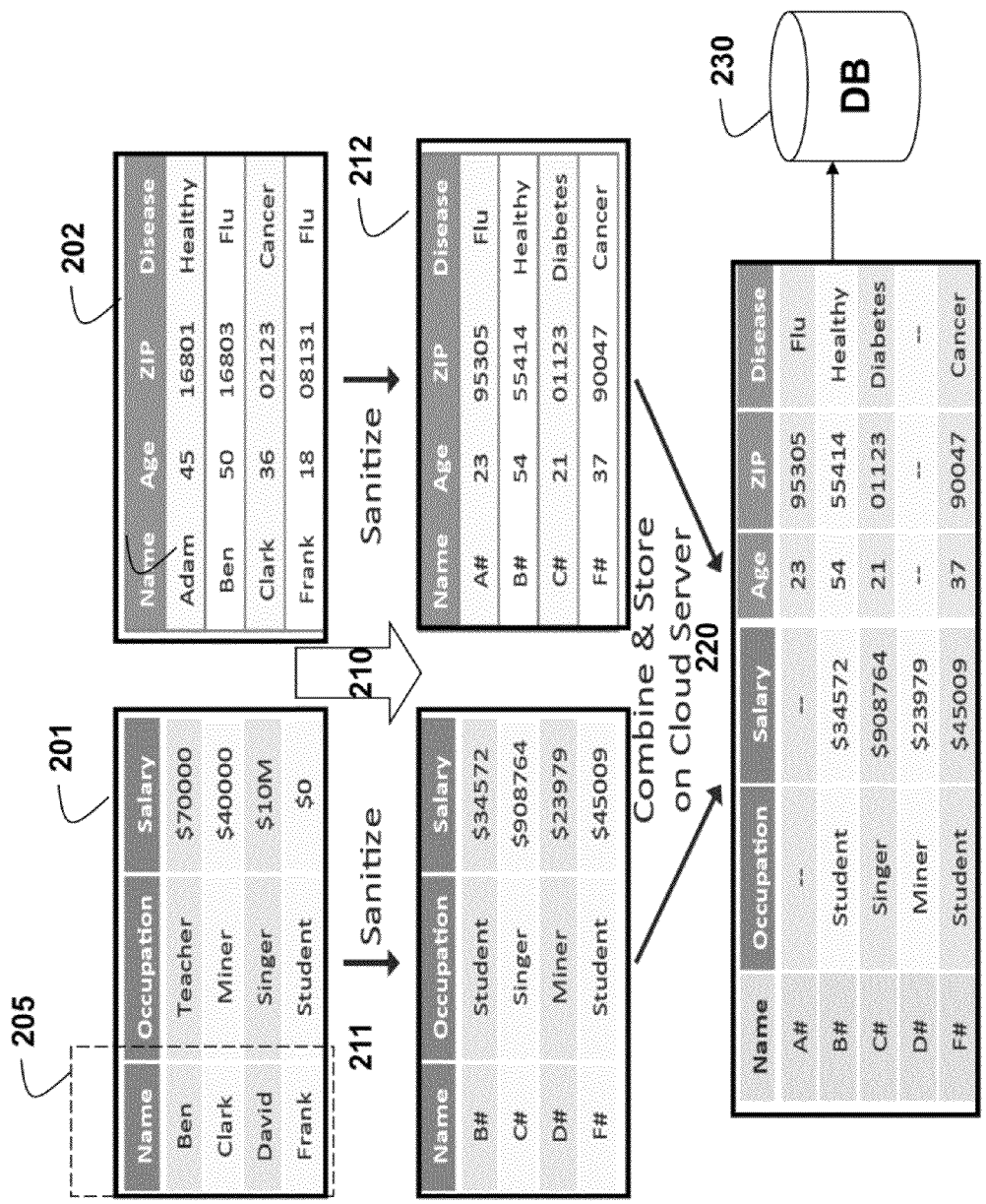
FIG. 2 is a block diagram of private data from two sources operated on according to embodiments of the invention.

For ease of this description as shown in FIG. 2, we present our problem formulation and results with two data sources Alice and Bob. However, our method can easily be generalized to more than two sources. Also, other levels of security with fewer or more randomizations can also be used.

Alice and Bob independently sanitize 210 data 201-202 to protect the privacy of respondents 205. As used herein, it is not possible to recover exact private information from sanitized data. A number of techniques are know for sanitizing data, e.g., adding random noise.

The sanitized data 211-212 are combined 220 into a database 230 at a "cloud" server. The server can be connected to a public network (Internet). This is the data is available for statistical analysis by an authorized user of a client.

Figure 3:
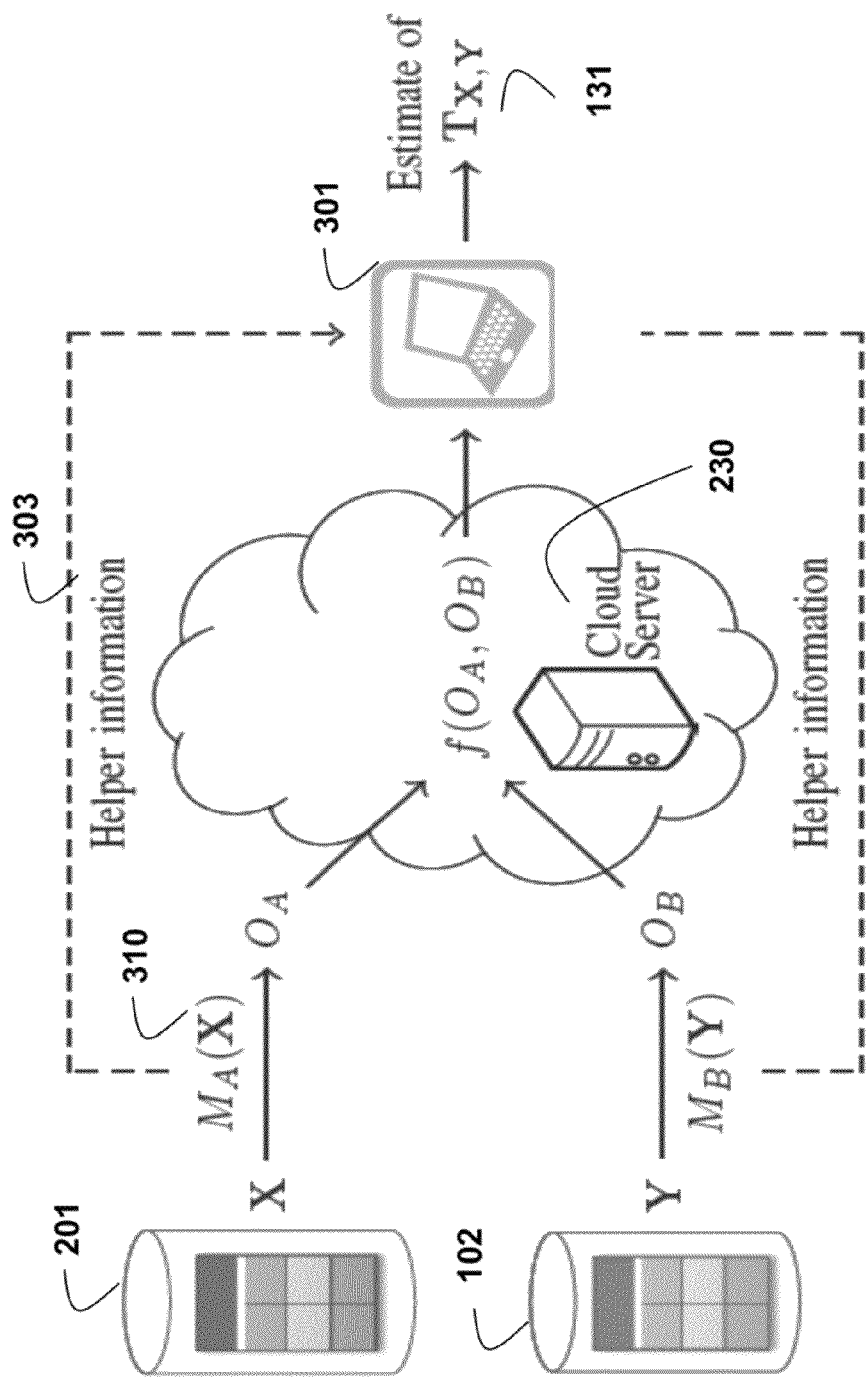
FIG. 3 is a schematic of a method according to embodiments of the invention for deriving statistics from the data of FIG. 2 by a third party without compromising privacy of the data.

As shown in FIG. 3, Alice and Bob store the sanitized data in at the server to facilitate transmission and computation required on these potentially large databases. An entrusted authorized client 301 can now perform statistical analysts on the data with the assistance of low-rate helper-information 303. The helper information is low-rate in that it is relatively small in comparison to the original database and/or the randomized data. The helper information 303 allows the authorized client to essentially undo the second randomization.

The analysis is subject to the following requirements. The private data of the sources should not be revealed to the server or the client. The statistics of the data provided by sources and Bob should not be revealed to the server. The client should be able to determine joint, marginal and conditional distributions of the data provided by Alice and Bob. The distributions are sufficient to determine first, second, etc. order statistics of the data.

Problem Framework and Notation

The Alice data are a sequence of random variables $X:=(X_1, X_2, \ldots, X_n)$, with each variable $X_i$ taking values from a finite-alphabet X. Likewise, Bob's data are modeled as a sequence of random variables $Y:=(Y_1, Y_2, \ldots, Y_n)$, with each $Y_i$ taking values from the finite-alphabet Y. The length of the sequences, n, represents the total number of respondents in the database, and each $(X_i, Y_i)$ pair represents the data of the respondent i collectively held by Alice and Bob, with the alphabet X×Y representing the domain of each respondent's data.

Data pairs $(X_i, Y_i)$ are independently and identically distributed (i.i.d.) according to a joint distribution $P_{X,Y}$ over X×Y, such that for $$x:=(x_1, \ldots, x_n) \in X^n, \text{ and } y:=(y_1, \ldots, y_n) \in Y^n,$$

$$\text{such that } P_{X,Y}(x,y) = \prod_{i=1}^{n} P_{X,Y}(x_i, y_i).$$

A privacy mechanism randomly maps 310 input to output, $M: I \to O$, according to a conditional distribution $P_{O|I}$. A post RAndomisation method (PRAM) is a class of privacy mechanisms where the input and output are both sequences. i.e., $I=O=D^n$ for an alphabet D, and each element of the input sequence is i.i.d. according to an element-wise conditional distribution.

Alice and bob each independently apply PRAM to their data as $R_A: X^n \to X^n$ and $R_B: Y^n \to Y^n$. The respective outputs are $$\tilde{X}:=(\tilde{X}_1, \ldots, \tilde{X}_n):=R_A(X)$$

and $$\tilde{Y}:=(\tilde{Y}_1, \ldots, \tilde{Y}_n):=R_B(Y),$$

and the governing distributions are
$P_{\tilde{X}|X}$ and $P_{\tilde{Y}|Y}$,
so we have that $$P_{\tilde{X},\tilde{Y}|X,Y}(\tilde{x}, \tilde{y} | x, y) = P_{\tilde{X}|X}(\tilde{x} | x) P_{\tilde{Y}|Y}(\tilde{y} | y)$$

$$= \prod_{i=1}^{n} P_{\tilde{X}|X}(\tilde{x}_i | x_i) P_{\tilde{Y}|Y}(\tilde{y}_i | y_i)$$

We also use $R_{AB}: X^n \times Y^n \to X^n \times Y^n$, defined by $$R_{AB}(X,Y):=(\tilde{X},\tilde{Y}):=(R_A(X), R_B(Y))$$

to denote a mechanism that arises from a concatenation of each individual mechanism. $R_{AB}$ is also a PRAM mechanism and is governed by the conditional distribution $P_{\tilde{X}|X}P_{\tilde{Y}|Y}$.

Type Notation

The type or empirical distribution of the sequence of the random variables $X=(X_1, \ldots, X_n)$ is the mapping $T_X: X \to [0, 1]$ defined by $$T_X(x) := \frac{|\{i: X_i = x\}|}{n}, \forall x \in X.$$

A joint type of two sequences $X=(X_1, \ldots, X_n)$ and $Y=(Y_1, \ldots, Y_n)$ is the mapping $T_{X,Y}: X \times Y \to [0,1]$ defined by $$T_{X,Y}(x,y) := \frac{|\{i: (X_i, Y_i) = (x,y)\}|}{n}, \forall (x,y) \in X \times Y.$$

A conditional type of a sequence $Y=(Y_1, \ldots, Y_n)$ given another $X=(X_1, \ldots, X_n)$ is the mapping $T_{Y|X}: Y \times X \to [0,1]$ defined by $$T_{Y|X}(y \mid x) := \frac{T_{Y,X}(y,x)}{T_X(x)} = \frac{|\{i: (Y_i, X_i) = (y,x)\}|}{|\{i: X_i = x\}|}.$$

The conditional distribution is the joint distribution divided by the marginal distribution.

Values of these type mappings are determined, given the underlying sequences, and are random when the sequences are random.

Matrix Notation for Distributions and Types

The various distributions, and types of finite-alphabet random variables can be represented as vectors or matrices. By fixing a consistent ordering on their finite domains, these mappings can be vectors or matrices indexed by their domains. The distribution $P_X: X \to [0,1]$ can be written as an $|X| \times 1$ column-vector $P_X$, whose $x^{th}$ element, for $x \in X$, is given by $P_X[x] := P_X(x)$.

A conditional distribution $P_{Y|X}: Y \times Y \to [0,1]$ can be written as a $|Y| \times |X|$ matrix $P_{Y|X}$, defined by $P_{Y|X}[y,x] := P_{Y|X}(y|x)$. A joint distribution $P_{X,Y}: X \times Y \to [0,1]$ can be written as a $|X| \times |Y|$ matrix $P_{X,Y}$, defined by $P_{X,Y}[x,y] := P_{X,Y}(x,y)$, or as a $|X||Y| \times 1$ column-vector $\overline{P}_{X,Y}$, formed by stacking the columns of $P_{X,Y}$.

We can similarly develop the matrix notation for types, with $T_X$, $T_{Y|X}$, $T_{X,Y}$ and $\overline{T}_{X,Y}$ similarly defined for sequences X and Y with respect to the corresponding type mappings. These type vectors or matrices are random quantities.

Privacy and Utility Conditions

We now formulate the privacy and utility requirements for this problem of computing statistics on independently sanitized data. According to the privacy requirements described above, the formulation consider privacy of the respondents, privacy of the distribution, and finally the utility for the client.

Privacy of the Respondents

The data related to a respondent must be kept private from all other parties, including any authorized, and perhaps untrusted clients. We formalize this notion using $\epsilon$-differential privacy for the respondents.

Definition: For $\epsilon \geq 0$, a randomized mechanism $M: D^n \to O$ gives $\epsilon$-differential privacy if for all data, sets $d, d' \in D^n$, within Hamming distance $d_H(d, d') \leq 1$, and all $S \subseteq O$, $$Pr[M(d) \in S] \leq e^\epsilon Pr[M(d') \in S].$$

Under the assumption, that the respondents are sampled i.i.d., a privacy mechanism that satisfies DP results in a strong privacy guarantee. Adversaries with knowledge of all respondents except one, cannot discover the data of the sole missing respondent. This notion of privacy is rigorous and widely accepted, and satisfies privacy axioms.

Privacy of the Distribution

Alice and Bob do not want to reveal the statistics of the data to adversaries, or to the server. Hence, the sources and server must ensure that the empirical distribution, i.e., the marginal and joint types cannot be recovered from $\hat{X}$ and $\hat{Y}$. As described above, $\epsilon$-DP cannot be used to characterize privacy in this case. To formulate a privacy notion for the empirical probability distribution, we extend $\epsilon$-differential privacy as follows.

Definition: ($\delta$-distributional $\epsilon$-differential privacy) Let $d(\bullet,\bullet)$ be a distance metric on the space of distributions. For $\epsilon, \delta \geq 0$, a randomized mechanism $M: D^n \to O$ gives $\delta$-distributional $\epsilon$-differential privacy if for all data sets $d, d' \in D^n$, with $d(T_d, T_{d'}) \leq \delta$, and all $S \subseteq O$, $$Pr[M(d) \in S] \leq e^\epsilon Pr[M(d') \in S].$$

A larger $\delta$ and smaller $\epsilon$ provides better protection of the distribution. Our definition also satisfies privacy axioms.

Utility for Authorized Clients

The authorized client extracts statistics from the randomized database 230. We model this problem as the reconstruction of the joint and marginal type functions $T_{X,Y}(x,y)$, $T_X(x)$, and $T_Y(y)$, or (equivalently) the matrices $T_{X,Y}$, $T_X$ and $T_Y$. The server facilitates this reconstruction by providing computation based on the sanitized data ($\hat{X}, \hat{Y}$). Alice and Bob provide low-rate, independently generated helper-information 203. With the server's computation and the helper-information, the client produces the estimates $\dot{T}_{X,Y}$, $\dot{T}_X$, and $\dot{T}_Y$.

For a distance metric $d(\bullet,\bullet)$ over the space of distributions, we define the expected utility of the estimates as $$\mu T_{X,Y} := E[-d(\dot{T}_{X,Y}, T_{X,Y})],$$

$$\mu T_X := E[-d(\dot{T}_X, T_X)], \text{ and}$$

$$\mu T_Y := E[-d(\dot{T}_Y, T_Y)].$$

Analysis of Privacy Requirements

The privacy protection of the marginal types of the database implies privacy protection for the joint type because the distance function d satisfies a general property shared by common distribution distance measures.

Lemma 1: Let $d(\bullet,\bullet)$ be a distance function such that $$d(T_{X,Y}, T_{X',Y'}) \geq \max(d(T_X, T_{X'}), d(T_Y, T_{Y'})). \quad (1)$$

Let $M_{AB}$ be the privacy mechanism defined by $M_{AB}(X,Y) := (M_A(X), M_B(Y))$. If $M_A$ satisfies $\delta$-distributional $\epsilon_1$-differential privacy and $M_B$ satisfies $\delta$-distributional $\epsilon_2$-differential privacy, then $M_{AB}$ satisfies $\delta$-distributional $(\epsilon_1 + \epsilon_2)$-differential privacy.

If vertically partitioned data are sanitized independently and we want to recover joint distribution from the sanitized table, the choice of privacy mechanisms is restricted to the class of PRAM procedures. We analyze the constraints that should be placed on the PRAM algorithms so that they satisfy the privacy constraints. First, consider the privacy requirement of the respondents in Alice and Bob's databases.

Lemma 2: Let $R: X^n \to X^n$ be a PRAM mechanism governed by conditional distribution $P_{\tilde{X}|X}$. R satisfies $\epsilon$-DP if $$\epsilon = \max_{x_1, x_2, \tilde{x} \in X} \ln(P_{\tilde{X}|X}(\tilde{x} \mid x_1)) - \ln(P_{\tilde{X}|X}(\tilde{x} \mid x_2)). \quad (2)$$

Lemma 3: Define $M_{AB}(x,y) = (M_A(x), M_B(y))$. If $M_A$ satisfies $\epsilon_1$-DP and $M_B$ satisfies $\epsilon_2$-DP, the $M_{AB}$ satisfies $(\epsilon_1 + \epsilon_2)$-DP.

The lemma can be extended to k sources where if $i^{th}$ source's sanitized data, satisfies $\epsilon_i$-DP, then the joint system provides $(\Sigma_{i=1}^{k}\epsilon_i)$-DP. Next, we consider the privacy requirement for the joint and marginal types.

Lemma 4: Let d(•,•) be the distance metric on the space of distributions. Let R: $X^n \to X^n$ be a PRAM mechanism governed by conditional distribution $P_{\hat{X}|X}$.

Necessary Condition: If R satisfies δ-distributional ε-DP, then R must satisfy $$\frac{\varepsilon}{\lfloor n/2 \rfloor} - DP$$

for the respondents.

Sufficient Condition: If R satisfies $$\frac{\varepsilon}{n} - DP$$

for the respondents, then R satisfies δ-distributional ε-DP.

Example Implementation

We now describe an example realization of the system framework given above, where the privacy mechanisms are selected to satisfy our privacy and utility requirements. The key requirements of this system can be summarized as follows:

(I). $R_{AB}$ is a δ-distributional ε-differentially private mechanism;
(II). Helper information is generated by a ε-DP algorithm; and
(III). $R_A$ and $R_B$ are PRAM mechanisms.

Because the santized data are generated by a δ-distributional ε-differentially private mechanism, helper information is necessary to accurately estimate the marginal and joint type. To generate outputs that preserve different levels of privacy, the sources use a multilevel privacy approach.

Figure 4:
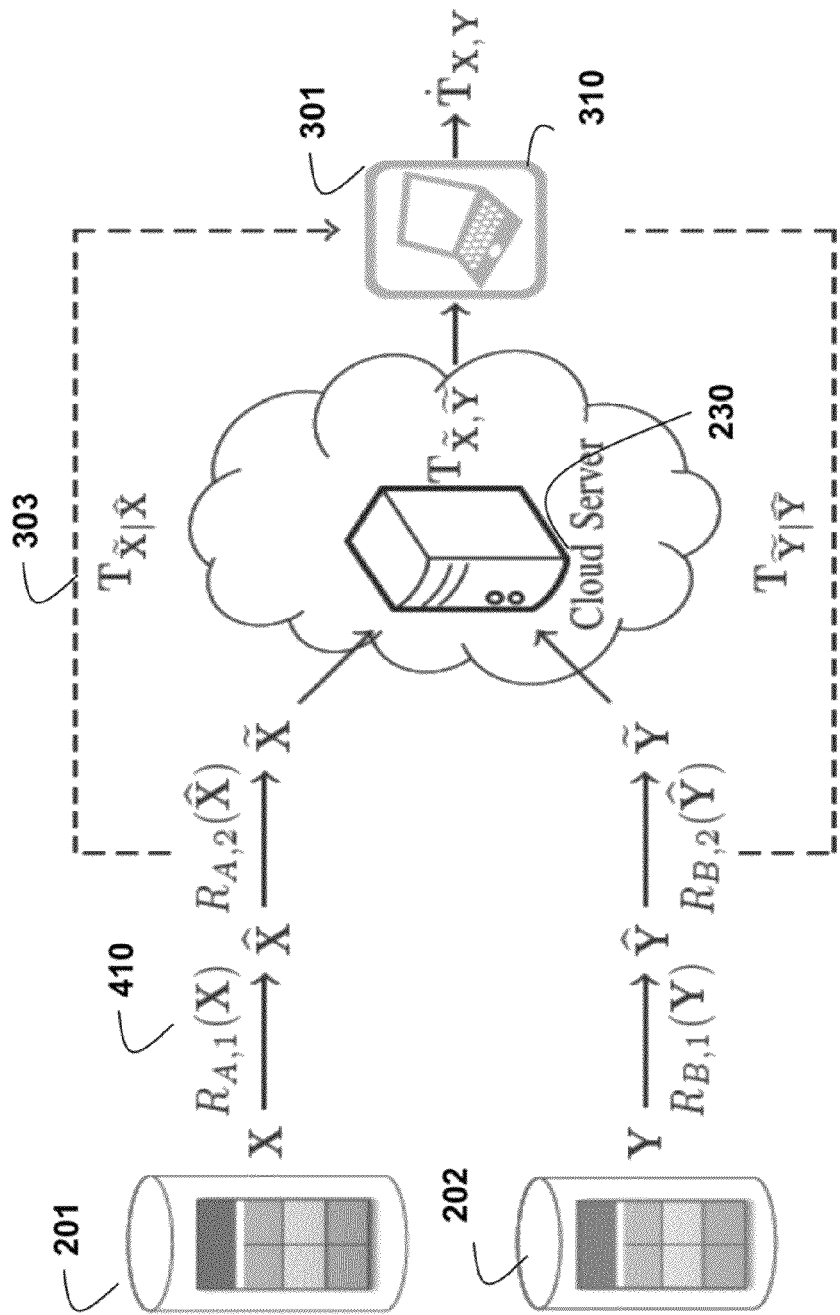
FIG. 4 is a schematic of an application of the method according to embodiments of the invention.

As shown in FIG. 4, the databases are sanitized by a two-pass randomization process 410, see FIG. 1. The first pass $R_{AB,1}$ takes the raw source data X,Y as input and guarantees the respondent privacy, while the second pass $R_{AB,2}$ takes the sanitized output $\hat{X}, \hat{Y}$ of the first pass as input and guarantees distributional privacy. The helper information 303 is extracted during the second pass to preserve respondent privacy. The mechanisms are constructed with the following constraints:

$R_{A,2}$ and $R_{B,2}$ are $\frac{\varepsilon}{2n} - DP;$.  (i)

$R_{A,1}$ and $R_{B,1}$ are $\frac{\varepsilon}{2} - DP;$.  (ii)

and (iii), $R_{A,1}$, $R_{A,2}$, $R_{B,1}$ and $R_{B,2}$ are PRAM, mechanisms.

By Lemma 3, constraint (ii) implies $R_{AB,1}$ is ε-DP and hence implies requirement (II). Note that $R_A(X)$ can be viewed as $R_{A,2}(R_{A,1})(X))$ and is governed by the conditional distribution (in matrix notation)

$$P_{\tilde{X}|X} = P_{\tilde{X}|\hat{X}} P_{\hat{X}|X}.$$

Hence, constraint (iii) implies that requirement (III) is satisfied. By Lemmas 1 and 4, constraint (i) implies that requirement (i) is satisfied. Now, all the privacy requirement are satisfied. In the following, we describe how the client can determine the estimated types.

Recall that without the helper information, the client cannot accurately estimate exact types due to requirement (I). In this example, the helper information includes the conditional types $T_{\tilde{X}|\hat{X}}$ and $T_{\tilde{Y}|\hat{Y}}$ determined during the second pass. An unbiased estimate of $T_X$ determined from $\hat{X}$ is given by $P_{\hat{X}|X}^{-1} T_{\hat{X}}$ and the exact types can be recovered by $T_{\tilde{X}|\hat{X}}^{-1} T_{\tilde{X}}$. Thus, we have the following identities and estimators:

$$T_{\hat{X}} = T_{\tilde{X}|\hat{X}}^{-1} T_{\tilde{X}},$$

$$\hat{T}_X = P_{\hat{X}|X}^{-1} T_{\hat{X}} = P_{\hat{X}|X}^{-1} T_{\tilde{X}|\hat{X}}^{-1} T_{\tilde{X}}, \quad (4)$$

$$T_{\hat{Y}} = T_{\tilde{Y}|\hat{Y}}^{-1} T_{\tilde{Y}},$$

$$\hat{T}_Y = P_{\hat{Y}|Y}^{-1} T_{\hat{Y}} = P_{\hat{Y}|Y}^{-1} T_{\tilde{Y}|\hat{Y}}^{-1} T_{\tilde{Y}}, \quad (5)$$

Extending the results to determine the joint type presents some challenges. The matrix form of the conditional distribution of the collective mechanism $R_{AB}$ is given by $P_{\hat{X},\hat{Y}|X,Y} = P_{\hat{X}|X} \otimes P_{\hat{Y}|Y}$ where ⊗ is the Kronecker product. An unbiased estimate of the joint type is given by $$\hat{T}_{X,Y} = P_{\hat{X}\hat{Y}|X,Y}^{-1} T_{\hat{X},\hat{Y}}$$
$$= ((P_{\tilde{X}|\hat{X}} P_{\hat{X}|X}) \otimes (P_{\tilde{Y}|\hat{Y}} P_{\hat{Y}|Y}))^{-1} T_{\tilde{X},\tilde{Y}}$$
$$= (P_{\tilde{X}|\hat{X}} P_{\hat{X}|X})^{-1} \otimes (P_{\tilde{Y}|\hat{Y}} P_{\hat{Y}|Y})^{-1} T_{\tilde{X},\tilde{Y}}$$
$$= (P_{\hat{X}|X}^{-1} \otimes P_{\hat{Y}|Y}^{-1})(P_{\tilde{X}|\hat{X}}^{-1} \otimes P_{\tilde{Y}|\hat{Y}}^{-1}) T_{\tilde{X},\tilde{Y}}$$
$$= (P_{\hat{X}|X}^{-1} \otimes P_{\hat{Y}|Y}^{-1}) \hat{T}_{\hat{X},\hat{Y}}.$$

Effect of the Invention

The embodiments of the invention provide a method for statistically analyzing sanitized private data stored at a server by an authorized, but perhaps, untrusted client in a distributed environment.

The client can determine empirical joint statistics on distributed databases without compromising the privacy of the data sources. Additionally, a differential privacy guarantee is provided against unauthorized parties accessing the sanitized data.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for securely determining aggregate statistics on private data, comprising the steps of:

randomizing, in a client, firstly and independently data X and Y to obtain randomized data $\hat{X}$ and $\hat{Y}$, respectively, wherein the randomizing firstly preserves a privacy of the data X and Y, wherein the randomizing operates directly on the data X and Y, wherein the data X are produced by a first data source, and the data Y are produced by a second data source, and the data X and Y are produced independently in a distributed manner;

randomizing, in the client, secondly independently the randomized data $\hat{X}$ and $\hat{Y}$ to obtain randomized data $\tilde{X}$ and $\tilde{Y}$ for a server, and helper information $T_{\tilde{X}|\hat{X}}$ and $T_{\tilde{Y}|\hat{Y}}$ for the client, respectively, wherein T represents an empirical distribution, and wherein the randomizing secondly preserves the privacy of the aggregate statistics of the data X and Y;

determining, at the server, $T_{\tilde{X},\tilde{Y}}$;

applying, by the client, the helper information $T_{\tilde{X}|X}$ and $T_{\tilde{Y}|Y}$ to $T_{\tilde{X},\tilde{Y}}$ to obtain an estimated $\hat{T}_{X,Y}$, wherein "|" and ";" between X and Y represent a conditional and joint distribution, respectively.

2. The method of claim 1, wherein the randomizing uses a Post RAndomisation Method (PRAM).

3. The method of claim 1, wherein the randomizing firstly and secondly are different.

4. The method of claim 1, wherein the helper information is small compared to the data X and Y.

5. The method of claim 1, wherein data X and Y are random sequences, and data pairs $(X_i, Y_i)$ are independently and identically distributed.

6. The method of claim 1, wherein the randomizing preserves differential and distributional privacy of the data X and Y.

7. The method of claim 1, wherein the randomizing secondly provides distributional privacy that is stronger than the differential privacy provided by the randomizing firstly.

* * * * *